(12) United States Patent
Roth et al.

(10) Patent No.: US 7,068,725 B2
(45) Date of Patent: Jun. 27, 2006

(54) BIT DETECTION THRESHOLD IN A TDMA BURST COMMUNICATION SYSTEM

(75) Inventors: Stephen A. Roth, Aumsville, OR (US); Thomas L. Mosher, Salem, OR (US)

(73) Assignee: Garmin AT, Inc., Salem, OR (US)

( * ) Notice: Subject to any disclaimer, the term of this patent is extended or adjusted under 35 U.S.C. 154(b) by 855 days.

(21) Appl. No.: 09/892,166

(22) Filed: Jun. 26, 2001

(65) Prior Publication Data
US 2002/0003814 A1    Jan. 10, 2002

Related U.S. Application Data

(60) Provisional application No. 60/217,241, filed on Jul. 10, 2000.

(51) Int. Cl.
H04L 25/34 (2006.01)
H04L 27/10 (2006.01)
H03D 3/00 (2006.01)

(52) U.S. Cl. .................... 375/272; 375/334
(58) Field of Classification Search ............ None
See application file for complete search history.

(56) References Cited

U.S. PATENT DOCUMENTS

| | | | |
|---|---|---|---|
| 3,750,168 A * | 7/1973 | Schrader et al. ........... 342/30 |
| 3,947,769 A | 3/1976 | Rousos et al. | |
| 5,412,309 A * | 5/1995 | Ueunten ............... 323/316 |
| 5,732,110 A | 3/1998 | Richards | |
| 5,781,588 A * | 7/1998 | Abe et al. ............... 375/334 |
| 5,896,422 A * | 4/1999 | Lu ........................ 375/317 |
| 6,381,264 B1 * | 4/2002 | Lomp et al. ............ 375/149 |
| 6,594,273 B1 * | 7/2003 | McGibney .............. 370/442 |
| 6,747,996 B1 * | 6/2004 | Holloway et al. ........ 370/503 |

FOREIGN PATENT DOCUMENTS

EP      0 394 064 A2     10/1990

* cited by examiner

*Primary Examiner*—Chau Nguyen
*Assistant Examiner*—Cynthia L. Davis
(74) *Attorney, Agent, or Firm*—David L. Terrell

(57) ABSTRACT

A method is disclosed for optimally adjusting the received bit detection threshold in a digital communication system, such as a TDMA system that is characterized by very short duration burst transmissions. In one embodiment of the invention, a half-duplex radio modem is used for transmission and receipt of messages for airborne and ground-based Automatic Dependent Surveillance-Broadcast (ADS-B) service. A feedback path is provided for in the transmission/receiver unit to provide the transmission signal to the receiver path. A bit detection threshold adjustment circuit receives the transmission signal. The circuit digitizes the analog baseband signal, detects the positive and negative peak values and calculates a peak-to-peak deviation value to define the bit detection threshold value.

17 Claims, 3 Drawing Sheets

US 7,068,725 B2

BIT DETECTION THRESHOLD IN A TDMA BURST COMMUNICATION SYSTEM

CROSS-REFERENCE TO RELATED APPLICATIONS

The present application claims priority from U.S. Provisional Patent Application Ser. No. 60/217,241, entitled "Adjustment of Bit Detection Threshold in a TDMA Burst Communication System", filed on 10 Jul. 2000, the contents of which are herein incorporated by reference.

FIELD OF THE INVENTION

The invention relates to a method and system for improving Time Division Multiple Access (TDMA) burst communication systems, and more particularly, a method and system for optimally adjusting the bit detection threshold in a TDMA communication system.

BACKGROUND OF THE INVENTION

In digital communications systems, it is critical to synchronize the data timing between transmit and receive stations in order to achieve highly efficient data link performance. Typically, receivers in such systems continuously monitor for signals using circuits that recover the data clock timing. Once the clock has been detected within a signal, the data is isolated and analyzed to determine the synchronization of the data message, which allows the signal to be decoded by the receiver. In systems with a transmitted modulation signal that is always present, or the transmissions are of long duration, techniques, such as the Costas Loop and Kalman filtering, are available to achieve and maintain accurate data timing synchronization.

However, in a TDMA communication system, particularly when the transmissions are of very short duration and occur at a high bit rate, many of the existing techniques for achieving accurate data timing synchronization are not feasible, produce unacceptably poor results and/or are characteristically inefficient. For instance, the output from the receiver can be continuously sampled, the data stored and statistically analyzed in real-time in an attempt to isolate and determine the timing of the short duration (i.e., burst) TDMA communication. This type of scheme is typically implemented using conventional brute force DSP techniques. The drawback of this type of data timing synchronization is that it is typically inefficient and implementation is costly.

In order to properly conduct data timing synchronization in the TDMA burst communication system it is necessary to eliminate the effect of the receiver bias voltage on the analog baseband output signal. The discriminator serves to convert the frequency deviation of the received signal into a voltage variation vs. time, along with a bias voltage. This bias voltage is subject to variation due to temperature, component aging, and other factors. These variations or offsets in the bias voltage adversely affect the ability of the data detection circuit to accurately convert the time-varying voltage into detected bits. More specifically, as offset bias voltage varies, the ideal received bit detection threshold of the discriminator drifts away from the center value, which has a tendency to cause an increase in the bit error rate. Because such systems operate at a megabit data rate, even slight drifts off center in the data bit threshold of the discriminator results in the loss of data.

Therefore, an unsatisfied need exits for a system and method for optimally adjusting the received bit detection threshold in a TDMA burst communication system. In such communication systems, once the received bit detection threshold has been adjusted, then determining the time synchronization becomes a much easier task, because sampling with the correct offset allows the receiver's synchronization process to solve for only the time uncertainty. Such a system and method should result in a simplified process that eliminates the need to implement sampling and/or post-processing of the analog baseband output signal.

SUMMARY OF THE INVENTION

The present invention is an improvement in short duration TDMA burst communication systems. Generally described, the invention monitors the self-generated transmission signal, typically an ownship signal generated by a vehicle, and determines the transmission signal center for use in setting the bit detection threshold for off air signals picked up by the receiver. The invention solves the problem of discriminator drift by calibrating the discriminator using the transmission signal. A system in accordance with the present invention detects the deviation based on the transmission signal and then compensates.

In an embodiment of the invention, a method for adjusting a received bit detection threshold in a digital communication system is provided. The method comprises receiving a self-generated (i.e., "ownship") broadcast signal, determining a median frequency of the self-generated broadcast signal and adjusting the bit detection threshold based on the median value.

Determining a median value of the self-generated broadcast signal typically involves detecting a positive peak value and a negative peak value for a self-generated broadcast signal and determining a peak-to-peak deviation of the self-generated broadcast signal. The positive and negative peak values are assessed concurrently with the transmission of the self-generated broadcast signal. In most applications a filtering process will be involved, post peak-to-peak deviation determination, to reduce short-term jitter and further define the bit detection threshold value. Typically, the self-generated broadcast signal is received through an intermediate level frequency feedback path of the transmit signal level feedback path located in the transmission/receiver unit.

In an alternate embodiment of the invention, a bit detection threshold adjustment circuit implemented in a TDMA communication system is defined. The circuit includes an analog-to-digital (A/D) converter that digitizes an analog baseband input signal by sampling the signal at a predefined data rate and positive/negative peak detectors in electrical communication with the A/D converter that receive the signal from the A/D converter and determine a positive and negative peak value. Additionally, the circuit will comprise a calculation task unit in data communication with the negative and positive peak detectors that calculates a peak-to-peak deviation to formulate a bit detection threshold value. The bit detection threshold value is communicated to a bit detector and is implemented along with the sampled signal from the A/D converter for the purpose of converting the sampled signal to a digitized bit stream of data. Typically, the circuit may include a filter in data communication with the calculation task unit that filters the peak-to-peak deviation value to reduce short-term jitter and further define the bit detection threshold value.

A system according to an embodiment of the present invention uses a radio frequency (RF) receiver discriminator wide enough to be linear over the dynamic range that it might drift. Preferably, a temperature compensating circuit keeps the discriminator within the linear range. The receiver remains active during transmission, and a feedback path at the transmit/receive switch is established to monitor the transmitted RF signal, which is a very clean signal with positive and negative peaks determined by the excursions of the frequencies. The analog baseband transmission signal is converted to a digital signal, after which a digital process measures the peaks and determines the center, which is set as the TDMA bit detection threshold. The center may be taken to be the average of the peaks.

According to another embodiment of the present invention, a feedback path at an intermediate frequency level is established. In this embodiment, a short modulation pattern may be transmitted within the aircraft's radio and used in place of the ownship signal to calibrate the discriminator. This technique is useful in a receive-only mode of operation when the RF power amplifier is not enabled, and thus, no short burst communication signal is transmitted.

BRIEF DESCRIPTION OF THE DRAWINGS

Some of the advantages of the present invention having been stated, others will appear as the description proceeds, when considered in conjunction with the accompanying drawings, which are not necessarily drawn to scale, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
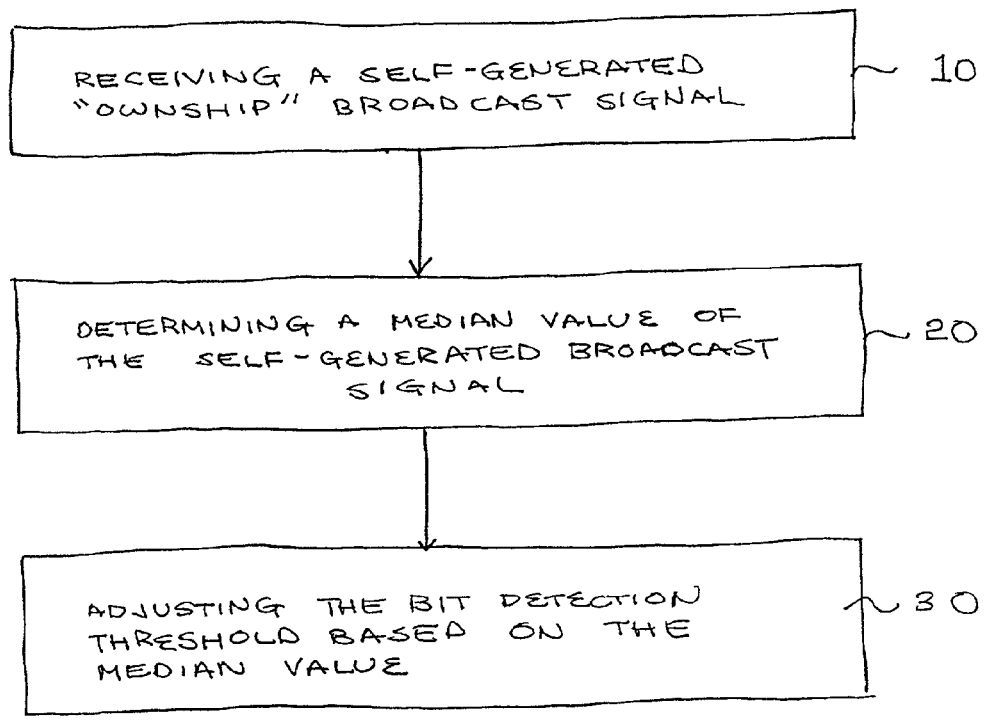
FIG. 1 is a flow diagram of a method for adjusting a received bit detection threshold in a digital communication system, in accordance with an embodiment of the present invention.

Referring to FIG. 1, shown is a flow diagram of a method for adjusting a received bit detection threshold in a digital communication system in accordance with an embodiment of the present invention. The digital communication system of interest will typically comprise a Time Division Multiple Access (TDMA) burst communication system that is characterized by short duration (i.e., bursts) communications at high data rates. It is also conceivable and within the inventive concepts herein disclosed to utilize the bit detection threshold adjustment scheme of the present invention with other digital communication systems. In one embodiment of the present invention, the TDMA burst communication system will be employed in an Automatic Dependent Surveillance Broadcast (ADS-B) service that is commonly used, for example, in the transmission of messages for airborne and ground-based communication. However, it will be recognized that the present invention is not limited to that application, but has wide application in other TDMA burst communication systems.

At step 10, the bit detection threshold adjustment process receives a self-generated broadcast signal, such as an "ownship" broadcast message being transmitted by an aircraft or any other vehicle. By way of example, in an ADS-B service, each equipped aircraft broadcasts a message that includes respective state vector information, such as position and velocity, at a typical interval of once per second. As is known by those of ordinary skill in the art, the term "ownship broadcast messages" (i.e., self-generated broadcast signals) refers to the signal that is transmitted by an aircraft and the term "off air broadcast messages" refers to signals transmitted by other entities in the communication system that are received by the "ownship" aircraft.

In order to monitor or receive the "ownship" transmission messages at the receiver bit detection circuit, a feedback path will typically need to be provided for within the transmission/receiver unit of the communication system. In one embodiment of the invention, a half-duplex radio modem is used as the transmission/receiver unit and a feedback path may be implemented within the modem to siphon the transmission signal from the transmission path to the receiver path. Various means of supplying a feedback signal to the receiver may be provided for and all are within the scope of the invention herein disclosed. By way of example, FIG. 2, which will be discussed at length later in the detailed description, illustrates two embodiments for providing a feedback path in a communication link, such as a modem.

Additionally, for the bit detection threshold adjustment process to receive or monitor a self-generated broadcast signal it is necessary for the receiver detection circuitry to remain active (i.e., armed) while the transmission of the "ownship" message occurs and to be de-activated (i.e., unarmed) when the transmission of the "ownship" message is complete. This insures that the bit detection adjustment process is limited to "ownship" broadcast messages and is not undertaken when the receiver receives off-air signals (i.e., broadcast messages from other entities).

At step 20, the bit detection threshold adjustment process determines a median value of the self-generated broadcast signal. In one embodiment of the invention, determining a median value further entails detecting a positive and a negative frequency value for the self-generated broadcast signal and determining a peak-to-peak deviation of the self-generated broadcast signal. For example, the transmission signal in an ADS-B service is typically a very clean signal with distinct positive and negative frequency peaks defined by the frequency excursions. The bit detection threshold adjustment process will detect these frequency peaks in the transmission signal and then calculate a peak-to-peak deviation, i.e., a median value.

At step 30, the bit detection threshold adjustment process adjusts the receiver bit detection threshold based upon the median value. In one embodiment of the invention, the peak-to-peak deviation undergoes filtering to reduce the short-term jitter in the measurement. The output of the filtering process is the bit detection threshold; defined as the midpoint between the logical 1 and 0 states. The bit detection threshold is communicated to a bit detector that serves to convert the sampled data into a digital bit stream.

Figure 2:
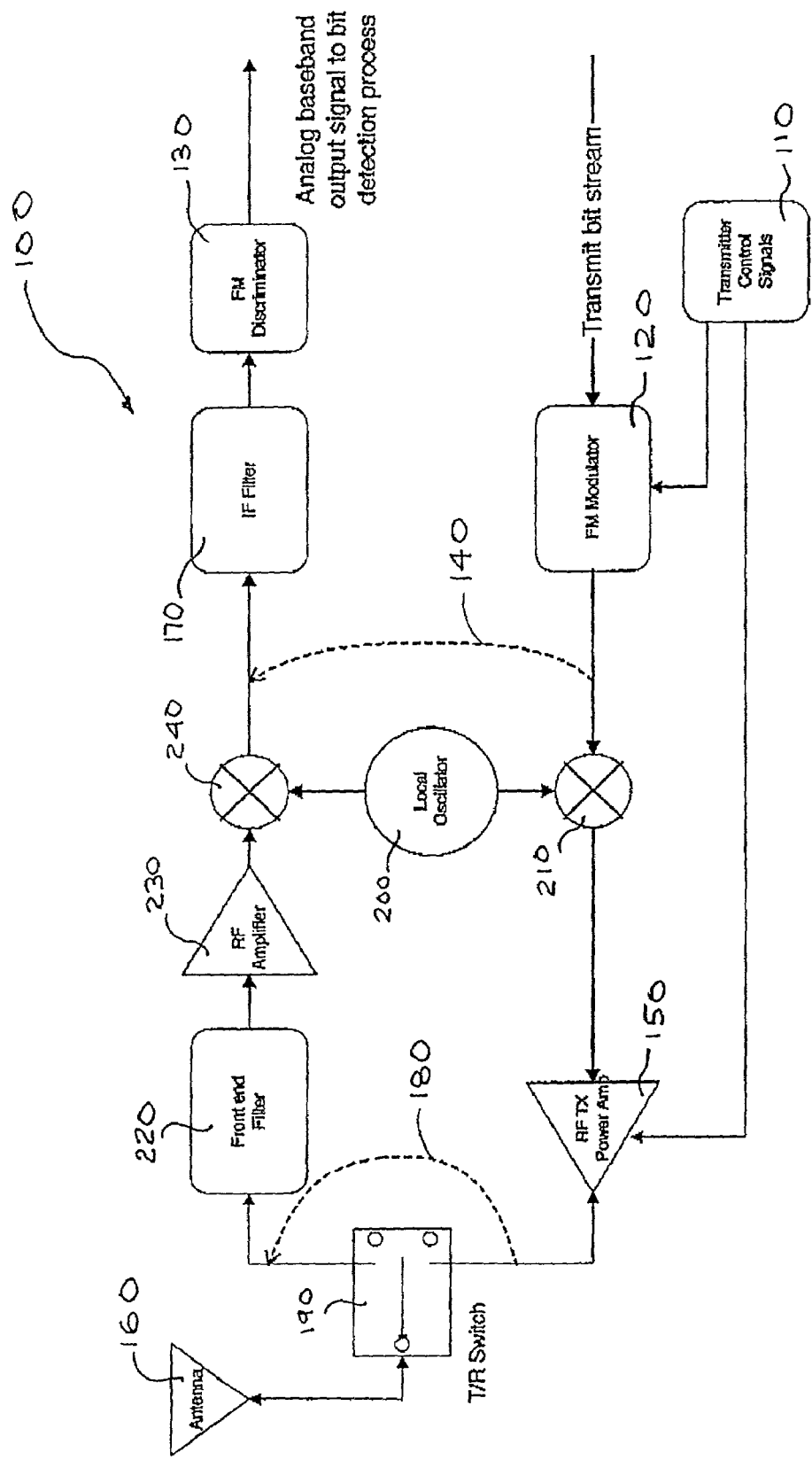
FIG. 2 is a high-level schematic block diagram of an exemplary RF transceiver (i.e., modem) in a digital communication network illustrating feedback paths in accordance with an embodiment of the present invention.

FIG. 2 is an illustration of suggested transmission feedback paths in a half-duplex modem circuit 100, in accordance with an embodiment of the present invention. Other means of transmitting and receiving signals may also be implemented in the digital communication system of the present invention and, thus, other feedback paths related to other transmission/receiver schemes are also within the realm of the present inventive concepts. In the embodiment shown, Binary Frequency Shift Keyed (BFSK) modulation is utilized as the radio frequency (RF) modulation technique. In BFSK modulation, the binary logic "1" value is represented by shifting the frequency of the RF carrier to a higher value, and a binary logic "0" value is represented by shifting the frequency of the RF carrier to a lower value.

The transmission of ownship data is initiated across the transmission path by activating transmission control signal 110 that powers the circuit and activates the FM modulator 120 to begin modulating the transmitted bit stream of data.

In normal ADS-B service, each aircraft broadcasts a message containing its state vector information (position and velocity) once per second. The broadcast message format includes an initial 36 bit string that defines a unique synchronization pattern. When the ADS-B service is operating in a receive-only mode the service does not broadcast messages, however, since the system is still receiving messages the need still exists to calibrate the system using a self-generated signal. Thus, in the receive-only mode an idle pattern is transmitted that does not typically include the synchronization pattern and is therefore not detected by other aircraft or base stations. For purposes of this discussion both the normal ADS-B service broadcast message and the Receive-Only mode idle pattern are collectively referred to as "ownship" messages/transmissions used in the calibration process of the present invention.

The transmission of ownship messages is initiated across the transmission path by activating transmission control signal 110 that powers the circuit and activates the FM modulator 120 to begin modulating the transmitted bit stream of data. The FM modulator converts the transmitted bit stream into a frequency modulated signal. In accordance with the present invention, the "ownship" transmission is used to determine the DC offset of the FM discriminator 130, so that the bit detection threshold can be adjusted accordingly. In order for the "ownship" transmission to be communicated to the FM modulator, a feedback path is provided to allow the transmission signal to siphon to the receiver path. In one embodiment of the invention, feedback path 140 performs the loopback function at the intermediate frequency level prior to the enablement of the RF power amplifier 150. Advantageously, this embodiment allows the threshold adjustment to occur without transmitting any RF signal via the antenna 160 such as if a unit is configured for Receive-Only service. In this instance the idle pattern serves as the "ownship" message for purposes of threshold adjustment. Though not shown, a switch actuated by the transmitter circuit can be included in feedback path 140 to selectively couple the transmit and receive paths.

Once the ownship transmission signal has been fed to the receive path, via feedback path 140, the signal will pass through the IF filter 170 that narrows the channel of the signal and then onto the FM discriminator 130. The FM discriminator is responsible converting the frequency deviation of the received signal into a voltage variation versus time. For purposes of illustration, the duration of a bit interval is approximately 1 microsecond, and the frequency shifts are about +/−300 kilohertz (kHz). For a typical FM discriminator the output of about 2.0 volts may exist when receiving a signal that represents the logic 1 frequency, and an output of about 1.0 volt when receiving a signal that represents the logic 0 frequency.

As discussed in the Background of the Invention, one characteristic of FM discriminators is that they are very susceptible to DC offset drift, due to temperature and calibration effects, among other factors. Compensation of the circuitry to eliminate this drift is problematic and expensive. Another characteristic of FM discriminators is that in the absence of a RF input signal, the output consists of a high level of noise. When a RF signal is present, the noise level is greatly reduced (the FM "quieting" effect), and the desired modulation predominates in the discriminator output signal. Other factors that might effect the DC offset of the FM discriminator (such as Doppler shift due to relative aircraft motion) are small in comparison to the normal deviation of the RF carrier by the BFSK modulation and, therefore, these lesser factors may be ignored for the purposes of mitigating the DC offset drift.

Alternatively, feedback path 180 can be implemented to perform the loopback function using the transmitted RF signal, as during normal ADS-B service. In this embodiment, the transmission signal parasitically leaks across the transmit/receive switch 190 to the receive path. As previously discussed, the transmission of "ownship" data is initiated by activating the transmission control signal 110 that powers the circuit and activates the FM modulator 120 to begin modulating the transmitted bit stream of data. Frequency from local oscillator 200 is added to the transmission signal at mixer 210 and the mixed signal is then amplified, at RF transmitting power amplifier 150, to provide sufficient transmission power. Prior to having the signal communicated to the transmit/receive switch 190 and the antenna 160, the signal may parasitically leak across the switch to the receive path.

Once the transmit signal has leaked to the receive path it will encounter front end filter 220 that serves to limit the signal to the bandwidth of interest and RF receiver power amplifier 230 that amplifies the signal to provide sufficient receiver power. Frequency from local oscillator 200 is added to the receiving signal at mixer 240 and the resulting signal is then communicated to the previously discussed IF filter 170 and FM discriminator 130. Advantageously, this embodiment, in which the transmit signal leaks across the switch 190, does not require any physical modifications of the modem circuit 100, and can occur during normal transmit operation of the modem.

Figure 3:
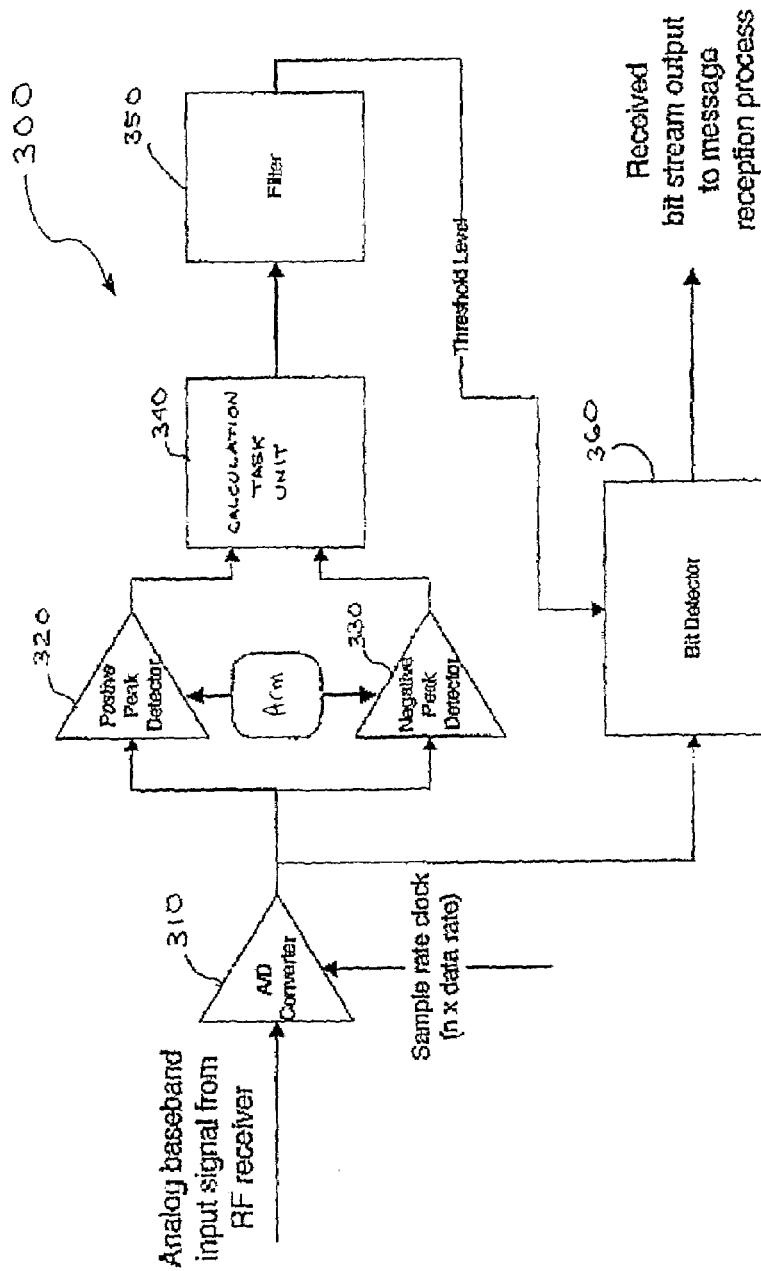
FIG. 3 is a high-level schematic block diagram of a bit detection threshold processing circuit suitable for use with the circuit of FIG. 1 and in accordance with one embodiment of the present invention.

With reference to FIG. 3, an illustrative bit detection circuit 300 is shown, in accordance with an embodiment of the present invention. It will be appreciated by those of ordinary skill in the art that the bit detection circuit elements described herein can be implemented in hardware, software or a combination thereof. In the bit detection circuit the analog baseband signal from the modem of FIG. 2 or any other transmission/receiver unit is processed. Initially, regardless of how feedback path is performed, an A/D converter 310 samples the analog baseband signal at a multiple of the data rate. A positive peak detector circuit 320 and negative peak detector circuits 330 are provided the digitized signal from the A/D converter 310. The peak detector circuits 320, 330 are armed once the transmitter has been activated, so that the detectors do not saturate on the high noise level present prior to the FM quieting effect taking place. When the detector circuits 320, 330 are armed, they clear the old value being held and begin to track the respective high and low peak input values.

Once the transmission has completed, the positive and negative peak detectors 320, 330 are dis-armed, and the values they have measured are read by the calculation task unit 340. The calculation task unit 340 finds the mean value between the positive and negative peak values (such as by averaging), and then the filter 350 applies a filter process to reduce short-term jitter in the measurement. The output of the filter 350 is the value of the signal that represents the midpoint between the logical 1 and 0 states, which is the bit detection threshold. The resulting bit detection threshold is communicated to the bit detector 360.

In this regard, the bit detection threshold is updated each time the ownship broadcasts a message, so that both short and long term drift are automatically compensated. The bit detector 360 uses this threshold value to convert the digitized baseband output into a stream of binary data. In the ADS-B service embodiment, the message reception process uses this stream of data bits to achieve the ideal time synchronization for reception of ADS-B messages sent by other aircraft.

In a preferred embodiment the A/D converter 310, the positive and negative peak detectors 320, 330 and the bit detector 360 may be embodied within hardware and the calculation task unit 340 and filter 350 may be implemented in software.

The present invention addresses an unsatisfied need for a system and method for optimally adjusting the received bit detection threshold in a TDMA burst communication system. As such, in systems employing the detection threshold adjustment scheme of the present invention, determining the time synchronization becomes a much easier task. The system and method described herein provides for a simplified process that eliminates the need to implement sampling and/or post-processing of the analog baseband output signal.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for adjusting a received bit detection threshold in a digital communication system, the method comprising:
    receiving a self-generated broadcast signal;
    determining a median value of the self-generated broadcast signal; and
    adjusting the bit detection threshold based on the median value.

2. The method of claim 1, further comprising digitizing the received self-generated broadcast signal prior to determining the median value of the self-generated broadcast signal.

3. The method of claim 1, wherein the step of receiving a self-generated broadcast signal further comprises receiving an ownship broadcast signal and wherein the step of determining a median value of the self-generated broadcast signal further comprises determining a median value of the ownship broadcast signal.

4. The method of claim 1, wherein determining a median value of the self-generated broadcast signal further comprises: detecting a positive peak frequency value and a negative frequency peak value for the self-generated broadcast signal; and determining a peak-to-peak deviation of the self-generated broadcast signal.

5. The method of claim 4, further comprising filtering the peak-to-peak deviation to substantially reduce short-term jitter and define the bit detection threshold value.

6. The method of claim 4, wherein detecting a positive peak value and a negative frequency peak value for a self-generated broadcast signal further comprises detecting a positive peak value and a negative frequency peak value substantially concurrent with the self-generated broadcast signal being transmitted.

7. The method of claim 1, wherein the step of receiving a self-generated broadcast signal further comprises receiving a self-generated broadcast signal through an intermediate level frequency feedback path.

8. The method of claim 1, wherein the step of receiving a self-generated broadcast signal further comprises receiving a self-generated broadcast signal through a transmit signet level frequency feedback path.

9. A method for adjusting a received bit detection threshold in a TDMA communication system, the method comprising:
    receiving an analog ownship broadcast signal;
    digitizing the analog ownship broadcast signal at a predefined data rate;
    detecting a positive peak value and a negative frequency peak value from the digitized ownship signal;
    calculating a peak-to-peak deviation for the digitized ownship signal based on the positive and negative frequency peak values; and
    adjusting the bit detection threshold based on the peak-to-peak deviation.

10. The method of claim 9, further comprising filtering the calculated peak-to-peak deviation to reduce short-term jitter.

11. A bit detection threshold adjustment circuit implemented in a TDMA communication device, the circuit comprising:
    an analog-to-digital (A/D) converter that digitizes an analog baseband input signal by sampling the signal at a predefined date rate;
    a positive peak detector in electrical communication with the A/D converter that receives the signal from the A/D converter and determines a positive peak value;
    a negative frequency peak detector in electrical communication with the A/D converter that receives the signal from the A/D converter and determines a negative frequency peak value;
    a calculation task unit in data communication with the negative and positive peak detectors that calculates a peak-to-peak deviation to formulate a bit detection threshold value; and
    a bit detector in data communication with the calculation task unit and in electrical communication with the A/D converter that receives the digitized signal from the A/D converter and the bit detection threshold value from the calculation task unit for the purpose of converting the digitized signal to a digitized bit stream of data.

12. The bit detection threshold adjustment circuit of claim 11, wherein the positive peak detector and the negative frequency peak detector are activated to detect frequency peaks when the TDMA communication device begins sending a signal and are deactivated when the TDMA communication device completes sending the signal.

13. The bit detection threshold adjustment circuit of claim 11, further comprising a filter in data communication with the calculation task unit that fitters the peak-to-peak deviation value to reduce short-term jitter.

14. The method of claim 1, wherein determining a median value of the self-generated broadcast signal comprises determining a median value between positive and negative peaks of the self-generated broadcast signal.

15. The method of claim 1, wherein the median value is a true median rather than a weighed average.

16. The method of claim 9, wherein the bit detection threshold is adjusted based at least in part on a true median rather than a weighed average.

17. The bit detection threshold adjustment circuit of claim 11, wherein the bit detection threshold is formulated based at least in part on a true median rather than a weighed average.

* * * * *